Oct. 6, 1964     E. R. MILLER     3,151,835
SAFETY AND SANITARY VALVES
Filed Aug. 1, 1960     2 Sheets-Sheet 1

INVENTOR.
Eldon R. Miller
BY
ATTORNEY

Oct. 6, 1964     E. R. MILLER     3,151,835
SAFETY AND SANITARY VALVES

Filed Aug. 1, 1960     2 Sheets-Sheet 2

INVENTOR.
Eldon R. Miller
BY
ATTORNEY

United States Patent Office 3,151,835
Patented Oct. 6, 1964

3,151,835
SAFETY AND SANITARY VALVES
Eldon R. Miller, Iowa City, Iowa, assignor to Eldon Miller, Inc., a corporation of Iowa
Filed Aug. 1, 1960, Ser. No. 46,775
3 Claims. (Cl. 251—63)

This invention relates to valves and particularly to improved sanitary safety valves especially adapted for use with vehicular tanks and similar containers.

In transporting commodities in tanks which may be hauled over highways by trucks, over railways as parts of tank cars, or otherwise transported, it is desirable to provide for readily and completely draining liquid commodities from the tank in order to facilitate complete cleaning of the interior of the tank and its associated parts to avoid any contamination between successive commodities carried by the tank. Furthermore, it is desirable that a valve for controlling the draining of commodities from such a tank should be easily operable from one or more remote positions. In transporting certain types of commodities, the tank and its accessories must not only meet sanitary code requirements, but must also be constructed to assure against accidental jamming in any given position and assure an automatic sealing of the outlet by the valve should the control lines or discharge lines become damaged as a result of any type of accident. This latter safety feature is necessary when transporting flammable commodities and is required by the Interstate Commerce Commission and by codes of various states and cities. The present valve is constructed to meet the requirements of both sanitary codes and flammable codes, as well as some corrosive liquid codes, so that it is particularly useful where various commodities may be transported in a tank at different times.

According to the present improved sanitary safety valve, all exposed parts are formed with smooth blending contours without sharp edges and with the drainage opening of the valve in the lowermost portion thereof, so that in the normal position of a tank provided with such a valve all liquid within the tank will normally drain out through the valve outlet opening so as completely to empty the tank when the valve is in its open position. In this manner, no residue will be held in the tank by the valve, and cleaning of the tank and the valve will be greatly facilitated, thereby assuring against contamination of a new commodity by the previous commodity in the tank. Furthermore, the operating parts of the valve which are exposed to the contents of the tank are fully sealed relative to each other and are constructed so that no residue will be held by any part of the valve when it is operated to its open position. In thus constructing the present improved valve, an internal spring is arranged automatically to close the valve if for any reason whatever the operating fluid pressure is released. This assures quick and complete closure of the valve to prevent discharge of contents from the tank through the valve whenever the operating fluid pressure is lost. In this manner, discharge of the contents of the tank through the valve is automatically prevented should the tank be involved in an accident, and, where the contents are flammable in nature, this is extremely important as it often may minimize or entirely prevent serious loss and damage if the tank is involved in an accident or fire. The present improved sanitary safety valve should meet the most stringent requirements of safety and flammable codes.

An object of the present invention is to provide an improved valve structure.

Another object of this invention is to provide an improved sanitary valve for use with the transport of edibles.

A further object of this invention is to provide an improved safety valve particularly adapted to use with mobile tanks for the transport of corrosive and flammable commodities.

Further objects and advantages of this invention will become apparent from the following description referring to the accompanying drawings, and the features of novelty which characterize this invention will be pointed out with particularity in the claims appended to and forming a part of this specification.

Figure 1:
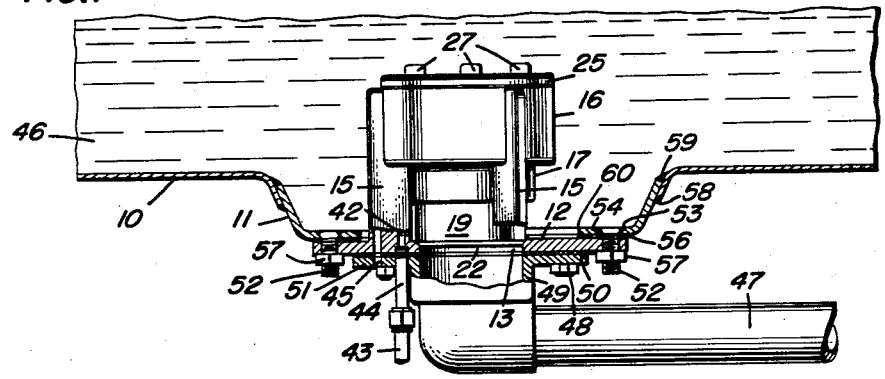
FIG. 1 is a side elevational view, partly broken away and partly in section, of a valve embodying the present invention secured to a tank and showing its connections to a control line and to a drain conduit.

Referring to the drawings, an improved sanitary safety valve incorporating the present invention is shown, for illustrative purposes, secured to the bottom of a tank 10 through a sump 11. In order to provide the desired sanitary and safety features, the improved valve comprises a unitary body member having a relatively flat, smooth mounting base plate portion 12 which is formed with a smooth, cylindrical outlet opening 13. This outlet terminates at its normally upper side in a smooth, tapered valve seat 14.

The valve is provided with an operating and guiding housing which is supported on the base plate portion 12 by a plurality of equiangularly spaced legs 15, preferably three in number, which are joined to the base plate and to the housing by smooth, curved filleted contours and are formed without sharp edges so that any liquid contacting the supporting legs will normally be drained downwardly to the fluid outlet passage formed by the opening 13 in the base plate. The valve housing includes an operating cylinder 16 spaced axially from the base plate 12 and formed with smooth, substantially cylindrical outer contours mounted on the upper portions of the supporting legs 15. A cylindrical guide sleeve 17 of smaller diameter than the operating cylinder 16 extends from the end of the operating cylinder nearer the base plate and preferably is integrally formed as a single unit with the operating cylinder, the supporting legs, and the base plate. As shown, this guide sleeve 17 may be integrally secured to the inner edges of the legs 15 and also to the operating cylinder 16 by a shoulder portion 18, all formed with smooth contours having curved filleted connections along all intersecting surfaces. This assures complete drainage of all liquid which contacts the surfaces of the operating cylinder, the guide sleeve, and the legs to the outlet opening 13 and prevents the accumulation of any residue of material on the surfaces of these valve parts.

The valve itself comprises a cylindrical member 19 having a smooth outer surface adapted to have a snug sliding fit within the inner cylindrical surface of the guide sleeve 17. It is preferably formed with a groove 20 extending circumferentially around the cylindrical valve member 19, intermediate the ends thereof, in a position which will remain normally closed by the inner surface of the guide sleeve 17 for all normal operating positions of the valve. A suitable sealing ring 21, preferably of the O-ring type, is mounted in the groove 20 under slight compression by the guide sleeve 17, so as to provide a good seal against the passage of fluid in either direction past the sealing ring 21. The lower end of the valve body is closed by an end wall 22 which forms the face of the valve. This valve face comprises a tapered surface 23 which is adapted to have a good metal-to-metal sealing engagement with the surface of the valve seat 14 when the valve is in its closed position. This tapered valve surface 23 extends from the smooth outer surface of the cylindrical valve member 19 and terminates at the other side in a smooth plane face 24 of the end wall 22. As can be most readily seen from FIGS. 3 and 4, this valve construction eliminates all exposure of valve operating elements and is comprised of only smooth cylindrical, plane, and curved connecting exposed surfaces for all positions of the valve.

In order to complete the smooth-surfaced sealed valve structure, a removable cap 25 is secured in any suitable manner to the normally upper end 26 of the operating cylinder 16, as by threaded engagement therewith. This cap preferably is formed with a plurality of lugs 27 extending from the smooth, plane upper surface thereof for engagement by a suitable lug wrench for tightly securing the cap in position and for unscrewing it when it is desired to inspect or repair the operating parts of the valve. The lugs 27 also are formed with smooth exterior surfaces all of which blend into each other and into the integral portion of the cap 25 which forms the cylinder head closing the upper end 26 of the operating cylinder 16. In order further to insure against possible leakage of fluid into and out of the operating cylinder through its connection to the cap 25, a sealing gasket 28 of any suitable material preferably is tightly clamped between the adjacent surfaces of the cap 25 and the end of the operating cylinder.

The valve is biased to its normally closed position by a suitable resilient compression coil spring 29 arranged within the valve member 19 and the operating cylinder 16 and held in compression between a pair of complementary movable spring seats 30 and 31. The spring seats and the compression spring are loosely held in assembled relationship by a through-bolt 32, which extends through openings 30' and 31' respectively in the base portions of the springs seats 30 and 31. This loose connection of the spring seats by means of the through-bolt 32 is desirable in order to assure complete extension of the compression spring 29, whereby it is free to bias the valve body at all times toward its closed position. Provision for this loose connection is conveniently obtained by screwing the nut 33 on the end of the bolt 32 so that when the spring seats 30 and 31 are extended into their maximum spaced relation, which is obtained when the valve face 23 is in tight sealing engagement with the valve seat surface 14, the bolt head 34 will not be drawn tightly against the adjacent end of the spring seat 30, and the bolt 32 thereby merely forms a spring and a spring seat assembly retaining connection. As is more clearly seen in FIG. 4, the spring seat 30 preferably slidably fits within the cylindrical valve member 19 and engages the inner surface of its end wall 22, while the spring seat 31 is biased by the compression spring 29 into engagement with a countersunk surface 35 on the inner side of the operating cylinder cap 25. In this manner, the valve is continuously biased toward its closed position by the compression spring 29 and, unless an external force is exerted on the valve in a direction tending to open it, it will inherently be moved to its closed position. This is a very important feature of the present valve in that it is automatically closed if for any reason the operating fluid pressure is lost, and this automatically prevents discharge of the contents of the tank. This is very important in mobile tanks where the commodity being transported is flammable and the fire hazard involved in accidents is very great, and where the commodity is corrosive and also must not be released in case of accident.

The valve is adapted to be operated to its open position for draining fluid through its outlet opening 13 by being operated against the pressure of the spring 29, whereby the valve surface 23 is moved away from the valve seat surface 14. Such actuation of the valve is obtained by supplying fluid under pressure from any suitable fluid storage pressure reservoir to a space 36 within the operating cylinder 16 between the inner surface of the shoulder 18 and the adjacent surface 37 of an operating piston 38 preferably integrally formed on the end of the cylindrical valve member 19 opposite its end wall 22. The operating piston 38 is formed with a smooth, cylindrical outer surface 39 having a snug sliding fit within the operating cylinder 16. It also preferably is formed with a sealing ring groove 40, in which a suitable sealing ring 41, such as an O-ring, is retained under slight compression in sealing engagement with the inner surface of the operating cylinder 16, so as to prevent leakage of fluid from the space 36. Operating fluid is adapted to be supplied to the space 36 in the operating cylinder through supply passages 42, preferably extending through at least two of the spaced legs 15. The fluid passages 42 may be connected to the fluid reservoir in any suitable manner, as by lines 43 connected to the passage 42 through suitable nipples 44.

When it is desired to operate the valve to its open position in order to drain a commodity through the outlet opening 13, fluid under pressure is supplied to the operating cylinder space 36 through the passages 42 so as to exert a pressure on the operating piston 38 tending to move it toward the cylinder head formed by the cap 25. Air which is trapped within the operating cylinder 16 between the cap 25 and the valve 19 tends to be compressed between the valve and the cylinder cap as the valve is moved to its open position. Such air is allowed to escape through vent passages 45, which preferably extend through at least two of the legs 15 and provide a communication between the upper end of the operating cylinder 16 adjacent to the cap 25 and the outer side of the mounting plate 12. A commodity 46 within the tank 10 thus can be drained through the outlet opening 13 of the valve into a suitable delivery conduit 47, which is secured in any suitable manner to the valve base plate 12, as by a plurality of studs 48 which extend through the base plate 12 and provide for securely bolting a conduit connector 49 to the base plate. In order to assure against undesirable leakage, a suitable gasket 50 preferably is clamped between the adjacent surfaces of the base plate 12 and the securing flange portion 51 of the conduit connector 49. Openings 52 are formed through the conduit connector flange 51 and the gasket 50 to provide communications between the vent passages 45 and atmosphere.

Figure 2:
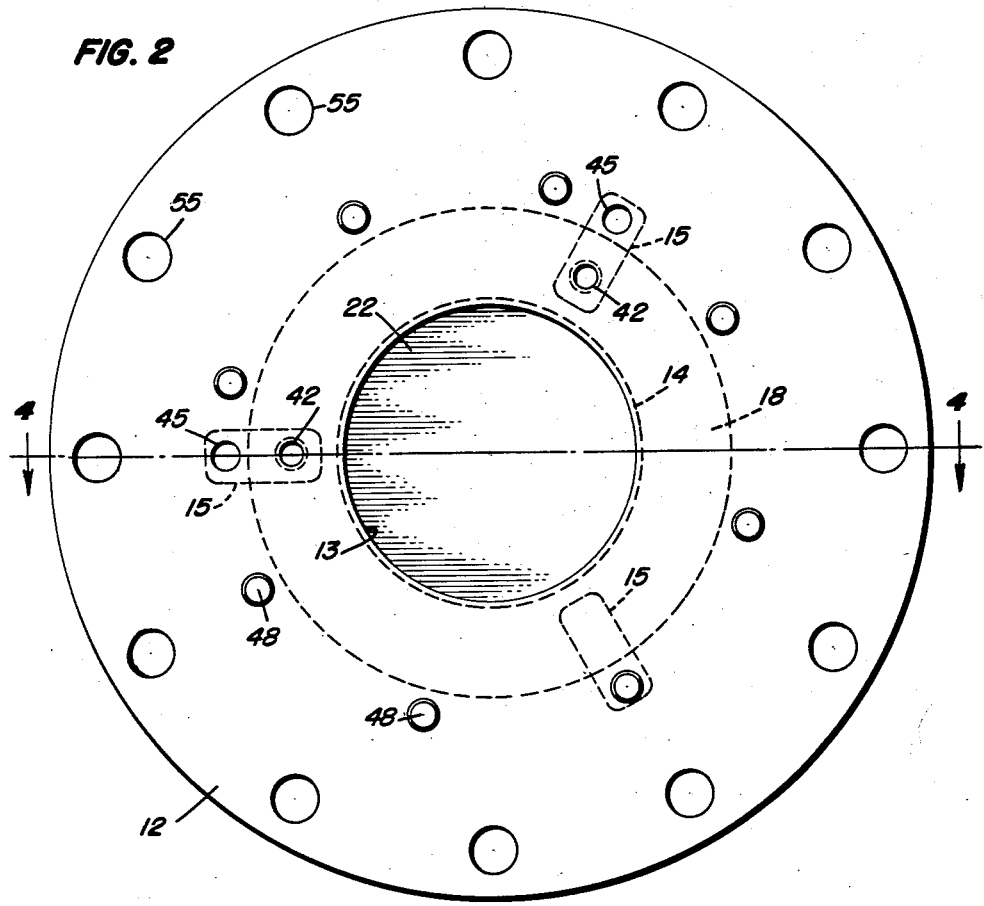
FIG. 2 is a plan view of the underside of the valve shown in FIGS. 1, 3, and 4.
Figure 3:
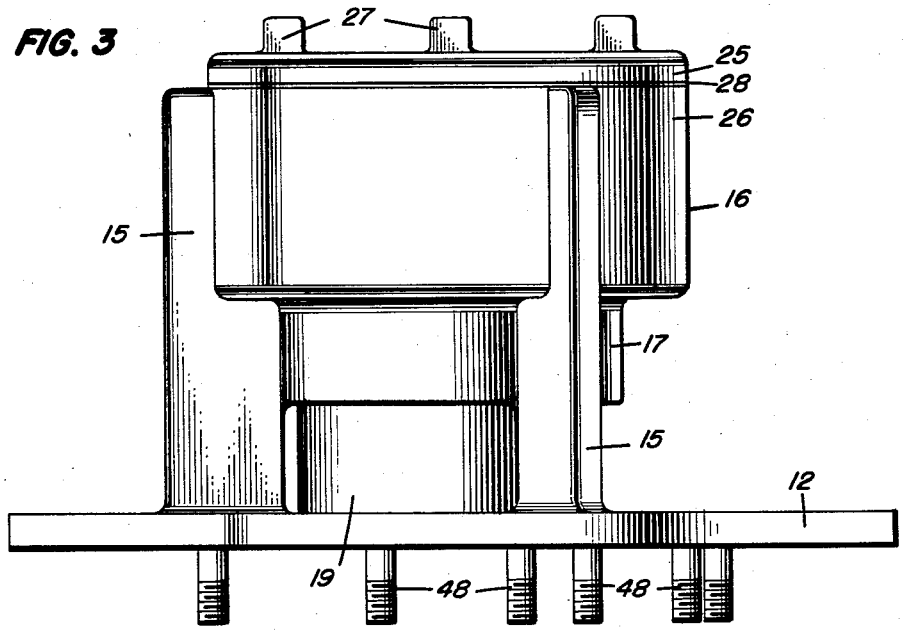
FIG. 3 is a side elevational view of the valve shown in FIGS. 1, 2, and 4.
Figure 4:
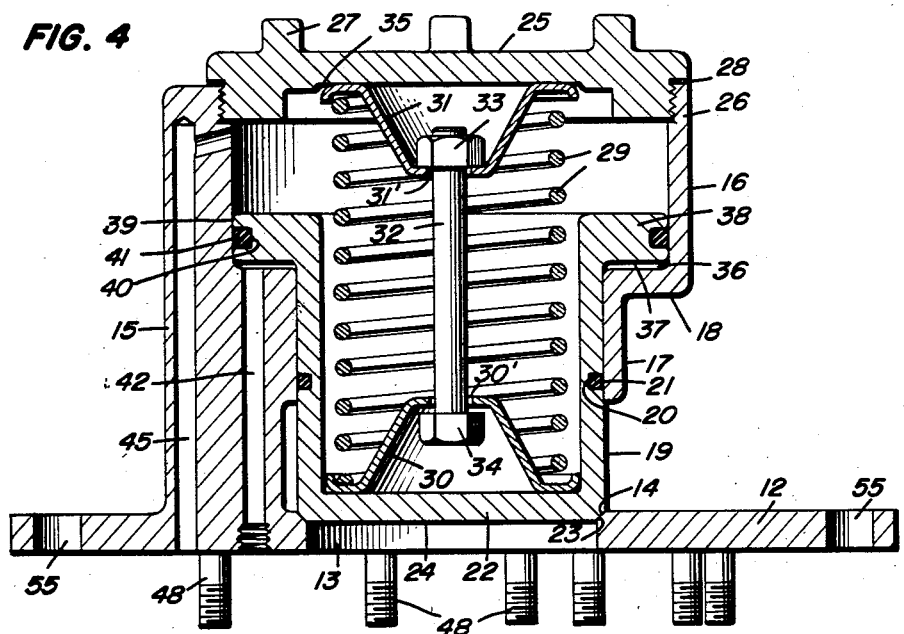
FIG. 4 is a sectional view, taken along line 4—4 of FIG. 2, of the valve shown in FIGS. 1, 2, and 3.

An improved valve assembly, such as that shown in FIGS. 2, 3, and 4, may be secured in any suitable manner to the normally lowermost part of a tank in order to assure a complete drainage thereof. Such a valve is particularly useful in connection with curved tanks having circular or oval cross sections. With such curved tanks, the valve assembly preferably is secured to a suitable drain sump 11 of any conventional type.

As is more clearly shown in FIG. 1, the drain sump 11 may be provided with studs 52 which have the heads thereof welded, as at 53, to the base portion 54 of the sump. A plurality of these studs 52 are equiangularly spaced around the sump base 54 and extend through suitable openings 55 in the base plate portion 12 of the valve. A suitable gasket 56 preferably is arranged between the underside of the sump and the valve base plate 12 to provide a good seal therebetween. Nuts 57 are adapted to be drawn tightly on the ends of the studs 52 against the underside of the valve base plate 12 so as to compress the gasket 56 and form the desired leakproof seal between the valve base plate 12 and the sump 11.

The sump 11 may be secured in any suitable manner to the tank 10, as by line welds 58 and 59 which integrally secure the sump to the tank. The weld 59 preferably is smoothed after being completed, so that it forms a continuous tapered surface connecting the inner surface of the tank 10 and the sump 11, and the inner edge 60 of a central opening through the base 54 of the sump also is tapered outwardly to assure that all connecting surfaces associated with the valve provide for drainage of a commodity from the tank downwardly toward the valve outlet opening 13. This construction assures complete drainage of all of the commodity from a tank provided with a valve of the present type and eliminates all possibility of entrapping and holding commodity on any parts of the valve.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

I claim:

1. A sanitary safety valve including a mounting base having a fluid passage port therethrough with a tapered valve seat formed around one edge of the port, an operating cylinder having smooth substantially cylindrical outer contours, three equally spaced legs for supporting said operating cylinder within said enclosure on said base on the same side thereof as said valve seat, an enclosure for said valve, a hollow cylindrical valve having a face adapted to close said fluid passage port by engagement with said seat, a cylinder head closing the end of said operating cylinder farther from said base, an operating piston formed as a flange on said cylindrical valve spaced longitudinally thereof from said valve face and arranged in good sliding engagement within said operating cylinder, a cylindrical guide sleeve fitted in good sliding engagement around said cylindrical valve and extending from said operating cylinder toward said base to a predetermined distance from said base, means having a smooth exterior surface connecting said sleeve to said operating cylinder, means including a sealing ring for sealing against fluid leakage between said operating cylinder and piston, means including a sealing ring for sealing against fluid leakage between said cylindrical valve and said guide sleeve, means totally enclosed by said operating cylinder and said cylindrical valve for resiliently biasing said valve away from said cylinder head and toward engagement with said valve seat, at least two of said legs having a passage therethrough forming a communication between an external source of fluid pressure and the interior of said operating cylinder on the side of said piston therein nearer to said valve face, and at least two of said legs having a vent passage therethrough forming a communication between the exterior side of said base away from said legs and the interior of said operating cylinder adjacent to said cylinder head and on the side of said piston away from said valve face, each of said legs being of elongated transverse sectional contour with the longest dimension of the transverse section extending in the direction of discharge flow to said port thereby to reduce turbulence and to promote swirl-free discharge, said legs being adapted to be within said enclosure interiorly of said port.

2. A sanitary and safety valve comprising a unitary valve member having a tapered valve face terminating on one side in a smooth plane face and on the other in a cylindrical guide section, an enclosure for said valve, an operating piston of larger diameter than said guide section extending from said guide section, a valve housing including an operating cylinder having a sliding fit with said operating piston and a cylindrical guide extending therefrom, said guide having a smaller diameter than said operating cylinder and formed with a bore having a sliding fit with said valve guide section, a mounting base having a valve seat therein adapted to have a sealing engagement with said valve face, means including a plurality of smooth surfaced legs of elongated sectional contours with the longest dimension in the direction of discharge flow thereby to reduce turbulence in said flow, said legs being circumferentially spaced and integral with and extending between said base and said cylinder for supporting said cylinder spaced axially from and on said base within said enclosure, resilient means for biasing said valve face into engagement with said valve seat, an open vent extending through at least one of said legs from said operating cylinder on the side of said piston away from said valve, and at least one of said legs having a fluid supply passage therethrough communicating with said operating cylinder on the side of said piston nearer said valve providing for the supply of fluid under pressure to said cylinder for moving said piston against said resilient biasing means to raise said valve face off said valve seat.

3. A valve structure adapted to be disposed within an enclosure for controlling fluid discharge therefrom and including a mounting base having a fluid passage therethrough with a valve seat formed around one end of the passage, an operating cylinder, a cylinder head closing the end of said operating cylinder farthest from said base, means including a plurality of legs spaced circumferentially around said passage for supporting said operating cylinder on said base and spaced therefrom on the same side thereof as said valve seat, a cylindrical valve having a face adapted to close said fluid passage by engagement with said seat, an operating piston on said cylindrical valve spaced longitudinally thereof from said valve face and arranged in good sliding engagement within said operating cylinder, a cylindrical guide sleeve extending from said operating cylinder toward said base to a predetermined distance therefrom and fitted in good sliding engagement around said cylindrical valve, totally enclosed means comprising a compression spring and a pair of spaced spring seats engaged by said spring and resiliently biased apart thereby into engagement one with said cylinder head and one with said cylindrical valve for resiliently biasing said valve away from said cylinder head and toward engagement with said valve seat, means forming a communication between an external source of fluid pressure and the interior of said operating cylinder on the side of said piston nearer to said valve face, and a vent passage forming a communication between the exterior side of said base away from said cylinder and the interior of said operating cylinder adjacent to said cylinder head and on the side of said piston away from said valve face, each of said legs having a smooth outer contour without sharp edges thereby to reduce turbulence and to promote swirl-free discharge through said port, said legs being adapted to be within said enclosure interiorly of said port.

References Cited in the file of this patent

UNITED STATES PATENTS

| | | |
|---|---|---|
| 1,832,341 | Williamson | Nov. 17, 1931 |
| 2,019,786 | Jurs | Nov. 5, 1935 |
| 2,239,169 | Frank | Apr. 22, 1941 |
| 2,672,888 | Shields | Mar. 28, 1954 |
| 2,728,547 | Crookston | Dec. 27, 1955 |
| 2,976,880 | Cassarino | Mar. 28, 1961 |

FOREIGN PATENTS

| | | |
|---|---|---|
| 1,054,190 | France | Oct. 7, 1953 |
| 1,079,256 | France | May 19, 1954 |
| 24,559 | Great Britain | Oct. 26, 1909 |